(12) United States Patent
Byrne

(10) Patent No.: US 11,856,397 B2
(45) Date of Patent: Dec. 26, 2023

(54) BASE STATION PROVIDING VIRTUAL WIRELESS ROUTER

(71) Applicant: T-Mobile USA, Inc., Bellevue, WA (US)

(72) Inventor: Cameron Byrne, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/162,033

(22) Filed: Jan. 29, 2021

(65) Prior Publication Data

US 2022/0248222 A1 Aug. 4, 2022

(51) Int. Cl.
*H04W 12/06* (2021.01)
*H04W 12/08* (2021.01)

(52) U.S. Cl.
CPC .......... *H04W 12/06* (2013.01); *H04W 12/08* (2013.01)

(58) Field of Classification Search
CPC ... H04W 12/06; H04W 40/02; H04W 40/248; H04W 84/042; H04W 84/12
See application file for complete search history.

(56) References Cited

U.S. PATENT DOCUMENTS

| | | | |
|---|---|---|---|
| 8,619,988 B2 | 12/2013 | Cai et al. | |
| 9,807,657 B2 | 10/2017 | Sharony et al. | |
| 10,952,079 B2* | 3/2021 | Wu | H04W 48/08 |
| 11,582,632 B2* | 2/2023 | Meredith | H04W 48/16 |
| 2011/0081890 A1* | 4/2011 | Ahmadvand | H04W 88/10 455/411 |
| 2014/0172947 A1 | 6/2014 | Ghai et al. | |
| 2014/0370879 A1* | 12/2014 | Redding | H04M 3/42178 455/419 |
| 2016/0330077 A1* | 11/2016 | Jin | H04L 41/0895 |
| 2017/0347269 A1* | 11/2017 | Wu | H04W 48/08 |
| 2018/0241626 A1* | 8/2018 | Kumar | H04W 12/0431 |
| 2019/0098556 A1* | 3/2019 | Johnson | H04W 48/02 |
| 2020/0162994 A1* | 5/2020 | Jayawardena | H04W 40/02 |
| 2021/0006535 A1* | 1/2021 | Kolanowski | H04W 12/35 |
| 2021/0013992 A1* | 1/2021 | Chuang | H04B 17/345 |
| 2021/0112382 A1* | 4/2021 | Oswal | H04L 67/30 |
| 2022/0248222 A1* | 8/2022 | Byrne | H04W 12/06 |

(Continued)

FOREIGN PATENT DOCUMENTS

EP 2051473 A1 4/2009

OTHER PUBLICATIONS

Xia, Lei et al; Virtual WiFi: Bring Virtualization from Wired to Wireless; Conference Paper; Jul. 2011; DOI: 10.1145/2007477.1952706 (13 pages).

(Continued)

*Primary Examiner* — Khawar Iqbal
(74) *Attorney, Agent, or Firm* — Lee & Hayes, P.C.

(57) ABSTRACT

A telecommunications system including a base station has a transceiver associated with a cellular network and a wireless access point. The system receives a request from a client device that includes a service set identifier (SSID). The system determines whether the SSID is registered for virtual wireless services and provisions a virtual router accessible through the wireless access point and identifiable using the SSID. The system may then authenticate and associate the client device with the virtual router.

20 Claims, 8 Drawing Sheets

(56) References Cited

U.S. PATENT DOCUMENTS

2023/0020413 A1* 1/2023 Huang ................. H04L 63/029

OTHER PUBLICATIONS

Extended European Search Report dated Jun. 2, 2022 for European Patent Application No. 22151468.0, 13 pages.
IEEE, "IEEE recommended practice for network reference model and functional description of IEEE 802(r) access network", IEEE Std 802.1CF-2019, May 30, 2019, pp. 1-185.

* cited by examiner

BASE STATION PROVIDING VIRTUAL WIRELESS ROUTER

BACKGROUND

Cellular communication devices use various network radio access technologies to wirelessly communicate data between users of the network using geographically distributed base stations and/or access points. Long-Term Evolution (LTE) is an example of a widely implemented radio access technology, which is used within $4^{th}$-Generation (4G) communication systems. New Radio (NR) is a newer radio access technology that is used in $5^{th}$-Generation (5G) communication systems. Standards for LTE and NR radio access technologies have been developed by the 3rd-Generation Partnership Project (3GPP) for use within cellular communication networks by wireless communication carriers.

Existing 4G networks use relatively low radio frequencies, such as frequencies in bands below 6 GHz. 5G networks are able to use an extended range of frequency bands compared to 4G networks, such as higher frequency bands in in the range of 6-100 GHz. Radio communications using the higher frequency 5G bands can support higher data speeds, but also have disadvantages compared to the lower frequency bands. Specifically, radio signals in the higher frequencies have shorter range and are more easily blocked by physical objects. Accordingly, the ability for a communication device to communicate using higher-frequency 5G bands may be sporadic as the device is physically moved.

Conventionally, users of data networks may gain access to the Internet either through directly connecting to LTE, 4G, or 5G base stations or by connecting to a modem and router which are physically connected to a broadband network via a cable or wire. The router may be connected to a wireless access point which could be incorporated within the router or be a separate piece of hardware. Computing devices may connect to the router using a service set identifier (SSID), which identifies the router, and in some cases the computing devices may need authentication credentials (e.g., username, password, or both) to associate with the router.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
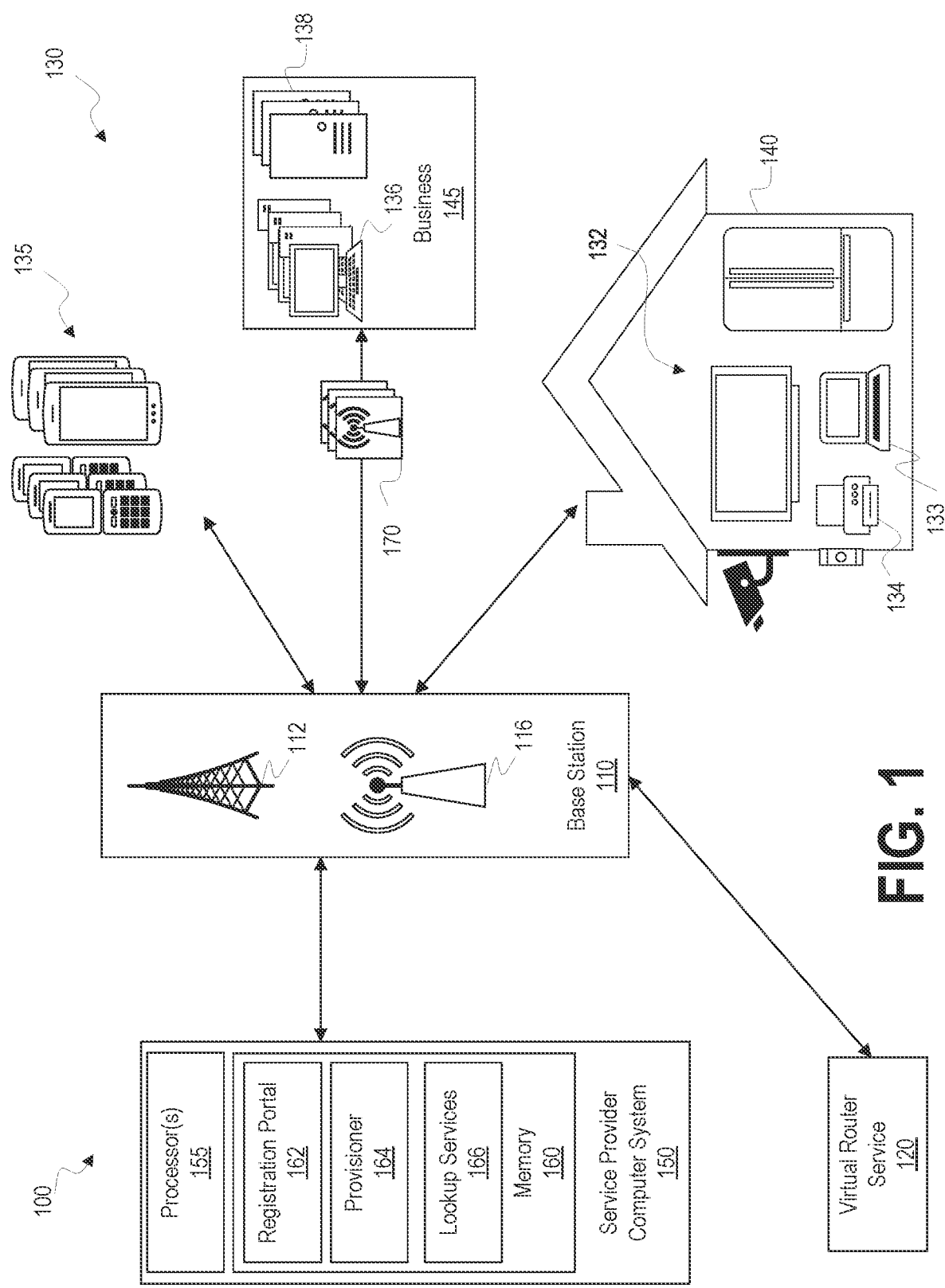
FIG. 1 illustrates a schematic diagram of an example telecommunications network environment providing virtual wireless services.

Examples in this disclosure describe methods, apparatuses, computer-readable media, and system(s) for providing broadband Internet access via virtual wireless services. The described virtual wireless services deploy virtual routers provisioned to base stations within a telecommunication network. The base stations may be small cell base stations of a 5G telecommunications network, and they can include a transceiver for providing high-frequency data connections (e.g., LTE or NR) and a wireless access point having a transceiver allowing for lower-frequency data connections (e.g., Wi-Fi, WiMAX, or IEEE 801.1X connections).

Traditionally, customers receive broadband Internet service through the use of customer premise equipment (CPE). CPE can include, for example, modems, routers, wireless access points, or Wi-Fi range extenders. In some implementations, functionality of multiple CPE can be combined in a single hardware device. For example, a modem, router, and wireless access point may be combined in a single unitary piece of CPE. However, for customers to receive broadband Internet service under the traditional model, a customer must obtain CPE either from the service provider or from a third-party.

Signing up for broadband Internet service can be cumbersome and labor-intensive. An example process for registering for broadband Internet service under the traditional model could include a customer calling a service provider to sign-up and register for service and having to schedule an appointment with the service provider for a technician to install a physical line (such as a fiberoptic cable or coaxial cable) connecting a network hub distanced from the customer's home or building to the home or building. Installation may require drilling holes in exterior walls, and installing and connecting physical equipment inside the customer's home or building. The turnaround time from the moment the customer decides to register for broadband Internet service to when the customer can use the service can often be longer than a week. Such turnaround time can be frustrating to customers and in some instances could result in loss of a customer account for a service provider when the service provider is unable to schedule a technician quickly enough. Moreover, the installation process can be expensive for the customer, service provider, or both due to the labor-intensive nature of installation.

Another issue that arises in traditional delivery of Internet broadband service is that each piece of CPE for each customer operates independently, and often times CPE of multiple customers is of similar make and model for a particular service provider. For example, a service provider may contract with a manufacturer of CPE to rent or sell to its customers, and the service provider may use the same model of CPE for all of its customers. When the service provider provides broadband Internet service to multiple customers within the same neighborhood, apartment building, office building, or same geographical region, customers' CPE may be communicating within the same frequency spectrum range and may be competing for bandwidth. Since each CPE operates independently, they cannot coordinate bandwidth to use it more efficiently. This problem can be exacerbated in high-density service areas, such as a large apartment building in a highly populated city.

To address the above identified concerns, and others, the disclosed examples concern delivering broadband Internet service without, or with minimal use of, CPE. The disclosed examples leverage the ubiquitous nature of small cells in telecommunications networks. Traditionally these small cells deliver NR or LTE based data services to mobile devices. The disclosed examples contemplate base stations also having transceivers providing Wi-Fi (e.g., IEEE 802.11) data services in addition to transceivers providing NR or LTE based data services. By utilizing base stations having Wi-Fi transceivers, a virtual router can be deployed to base stations within the telecommunications network eliminating or reducing the need for CPE. While many examples disclosed herein focus on small cell deployment, the spirit and scope of the present disclosure is not limited to small cells.

Using the disclosed examples, a customer may register for virtual wireless services through a registration portal offered by the service provider. For example, the customer may provide their name, phone number, address, and billing information through the registration portal. The customer may also provide a service set identifier (SSID) to the registration portal. Once the registration process is complete, the service provider may instantiate and deploy a virtual router to a base station proximate to the customer's location. The customer may then be able to connect one or more computing devices or other user equipment to the virtual router using the SSID the customer provided during the registration process.

Base stations according to disclosed examples that include wireless access points can address some of the issues of providing broadband Internet access solely via NR or LTE technology. For example, wireless access point transceivers typically operate within a frequency range where signals can more easily penetrate structures than NR or LTE technology. Additionally, Wi-Fi technology is unlicensed and ubiquitous, especially within the home environment. For example, most Internet of things (IoT) devices, home computing devices, and wireless peripherals communicate via Wi-Fi protocols, making it difficult or impossible for these devices to communicate with a base station that only transmits data over NR or LTE frequency bands without CPE. By providing a wireless access point at the base station, customers can leverage the advantages of Wi-Fi access without the disadvantages and frustrations of needing CPE.

In addition, the disclosed examples describe provisioning virtual wireless services via a common connection point, either the base station itself or via a computer network supporting the base station from the backend. This allows the service provider to manage devices within frequency bands to avoid issues that may arise from crowded bandwidth because it has insight into what devices are connected to particular base stations at a given time. As a result, a telecommunications network employing the disclosed examples may alleviate issues concerning frequency spectrum use that could occur when multiple pieces of CPE are communicating with a single base station on the same, or close, frequencies.

Disclosed examples also allow for a geographically disperse virtual local area network (LAN) with minimal set-up for the customer. For example, a customer may have one or more computing devices or user equipment connected to a base station close to their home. Those devices may be connected to the base station via a virtual router deployed at the base station with the customer's supplied SSID. The customer may also have mobile computing devices that are not at their home. For example, the customer may have a laptop mobile device on their person while they are traveling or while they are at work. With the disclosed examples, all of the customer's devices, whether they be at home or away from home, can communicate with each other as if they were on the same physical LAN. This can allow, for example, a customer to print a document on their home computer—connected to virtual wireless services via a base station close to home—from a mobile device that is far away from their home and connected to a different base station than the customer's home computing devices.

Certain implementations and examples of the disclosure will now be described more fully below with reference to the accompanying figures, in which various aspects are shown. However, the various aspects may be implemented in many different forms and should not be construed as limited to the implementations set forth herein. It will be appreciated that the disclosure encompasses variations of the described examples. Like numbers refer to like elements throughout.

FIG. 1 illustrates a schematic diagram of an example telecommunications network environment 100 providing virtual wireless services consistent with disclosed examples. Network environment 100 can include a base station 110 that has a cellular transceiver 112 and a wireless access point 116. Base station 110 can be in communication with a virtual router service 120 consistent with disclosed examples. Base station 110 can also be in communication with user equipment 130 ("UE").

According to some examples, base station 110 may communicate voice traffic and/or data traffic with one or more UEs 130 using RF signals. In some examples, cellular transceiver 112 of base station 110 may communicate with UE 130 using one or more appropriate cellular wireless communication protocols or standards. For example, cellular transceiver 112 may communicate with UE 130 using one or more standards, including but not limited to GSM, Time Division Multiple Access (TDMA), Universal Mobile Telecommunications System (UMTS), Evolution-Data Optimized (EVDO), Long Term Evolution (LTE), Fifth Generation (5G), Generic Access Network (GAN), Unlicensed Mobile Access (UMA), Code Division Multiple Access (CDMA) protocols (including IS-95, IS-2000, and IS-856 protocols), Advanced LTE or LTE+, Orthogonal Frequency Division Multiple Access (OFDM), General Packet Radio Service (GPRS), Enhanced Data GSM Environment (EDGE), Advanced Mobile Phone System (AMPS).

In some examples, wireless access point 116 of base station 110 can be configured to communicate with UE using Wi-Fi protocols (including IEEE 802.11 protocols), WiMAX protocols (including IEEE 802.16e-2005 and IEEE 802.16m protocols), High Speed Packet Access (HSPA) (including High Speed Downlink Packet Access (HSDPA) and High Speed Uplink Packet Access (HSUPA)), Ultra Mobile Broadband (UMB), and/or the like. Consistent with disclosed examples, UE 130 can communicate with wireless access point 116 to receive virtual wireless services via a virtual router, as disclosed herein.

According to some examples, base station 110 may support packet-switched or circuit-switched connections and may include a number of network components. Such components may include a home location register (HLR) or HSS for storing user and device information, as well as IMS components, such as the P-CSCF and S-CSCF. The components may also include an application server(s), such as a telephony application server (TAS) or rich communication service (RCS) server. Further, base station 110 may connect to networks having an account information server (AIS), which may provide network identities, contact addresses, credentials, and other information to the UEs 130.

According to some examples, base station 110 can be a small cell connected to a 5G core network comprising any of an Access and Mobility Management Function (AMF), a Session Management Function (SMF), a Policy Control Function (PCF), an Application Function (AF), an Authentication Server Function (AUSF), a Network Slice Selection Function (NSSF), a Unified Data Management (UDM), a Network Exposure Function (NEF), a Network Repository Function (NRF), a User Plane Function (UPF), a data network (DN), and the like. Base station 110 can include a femtocell, picocell, or microcell providing radio access to UEs 130 via cellular transceiver 112.

In addition to, or instead of the configuration described above, base station 110 may be connected to a 4G core network comprising a Mobility Management Entity (MME), a Serving Gateway (SGW), a Packet Data Network (PDN) Gateway (PGW), a Home Subscriber Server (HSS), an Access Network Discovery and Selection Function (ANDSF), an evolved Packet Data Gateway (ePDG), a Data Network (DN), and the like.

In some cases, base station 110 can communicate using licensed spectrum or unlicensed spectrum. For example, base station 110 may communicate via wireless access point 116 using unlicensed RF bands, such as Wi-Fi, Bluetooth, etc., each of which may have different characteristics that may affect communication with UEs 130. Similarly, base station 110 may communicate via cellular transceiver 112 using licensed RF bands, such as RF signals according to 3rd Generation Partnership Project (3GPP) protocols, Universal Mobile Telecommunications System (UMTS) protocols, Long Term Evolution (LTE) protocols, Fifth Generation (5G) protocols, etc., which may affect communication with UEs 130 differently from each other and from communication with UEs 130 using unlicensed spectra. For example, each licensed or unlicensed communication protocol may have different ranges of effectiveness or may have differing abilities to penetrate walls or other materials.

UE 130 can include internet-of-things ("IoT") devices 132 (e.g., appliances, security cameras, video doorbells, televisions), laptop 133, printer 134, mobile devices 135, computer workstations 136, or servers 138, or other network capable computing devices as just some examples. As shown in FIG. 1, user equipment 130 can be located within a residence 140, a business 145, or located outside of a building or dwelling. UE 130 can include any appropriate device, e.g., a stationary device or a portable electronic device, for communicating over a wireless communication network. As such, UE 130 can range in terms of capabilities and features. The UE 130 may also comprise a SIM-less device (i.e., a UE that does not contain a functional subscriber identity module ("SIM")), a roaming UE (i.e., a UE operating outside of their home access network), and/or mobile software applications.

In some examples, UE 130 can include mobile devices 135 that may have a numeric keypad, a capability to display only a few lines of text at a time and be configured to interoperate with Global System for Mobile Communications (GSM) networks. Mobile devices 135 may also, or alternatively, have a touch-sensitive screen, a stylus, an embedded Global Positioning System (GPS) receiver, and a relatively high-resolution display, and be configured to interoperate with multiple types of networks.

Virtual router service 120 can be a service providing virtual router functions to UE 130 via base station 110. The functions provided by virtual router service 120 can include those functions that are typical and expected of network routers, as known in the art. For example, these functions can include, among other things, managing authorization and association of one or more UE 130 with a LAN, routing data packets between UE 130 within the LAN, routing data packets to computing devices outside of the LAN, managing router tables, and providing security features for UE 130 connecting to the virtual router. In some examples, virtual router service 120 can be a remote service provided by one or more computing systems networked with base station 110, such as a SaaS offered through a cloud computing cluster or server. Although depicted differently in FIG. 1, virtual router service 120 can also be local to base station 110 in some examples.

Base station 110 can be in communication with service provider computer system 150. Service provider computer system 150 can include one or more processors 155 and memory 160 storing computer executable instructions that when executed by the one or more processors 155 cause the processors to perform operations providing a registration portal 162, a provisioner 164, and lookup services 166. Consistent with disclosed examples, registration portal 162, provisioner 164 and lookup services 166 can be components enabling provisioning and registration of virtual wireless services to UEs 130 within network environment 100.

Registration portal 162 can be a web portal providing webpages allowing a customer using UE 130 to sign-up or register for virtual wireless services with the service provider. For example, registration portal 162 can provide a webpage allowing a customer to enter their name, address, phone number, cellular service account number, email address, and payment information, among other information, to create an account for virtual wireless services. Registration portal 162 can also include a webpage or other user interface element allowing a customer to create a service set identifier (SSID) and password for a virtual router associated with the customer. Registration portal 162 can also provide other webpages or user interface elements providing the terms and conditions of using the virtual wireless services, help functionality, or other information that may be useful to the customer when registering for, or using, virtual wireless services. For example, registration portal 162 can provide webpages allowing a customer to update or change their contact information or change service.

Provisioner 164 may perform operations to manage the provision of virtual routers by virtual router service 120. For example, provisioner 164 may receive a request to create a new virtual router based on a customer registering for virtual wireless services, or may perform operations to determine whether a customer or an SSID is registered for virtual wireless services. In some examples, provisioner 164 may interact with lookup services 166 to perform these operations. For example, lookup services 166 could include, or interface with, a database including customer information, account status information, and SSID information.

In some examples, base station 110 may interface with one or more Wi-Fi repeaters 170. Wi-Fi repeaters 170 may act to repeat a Wi-Fi signal within a building, or outside of the building, to extend the range of base station 110 or to provide increased signal strength of the Wi-Fi signal being transmitted by wireless access point 116.

Figure 2:
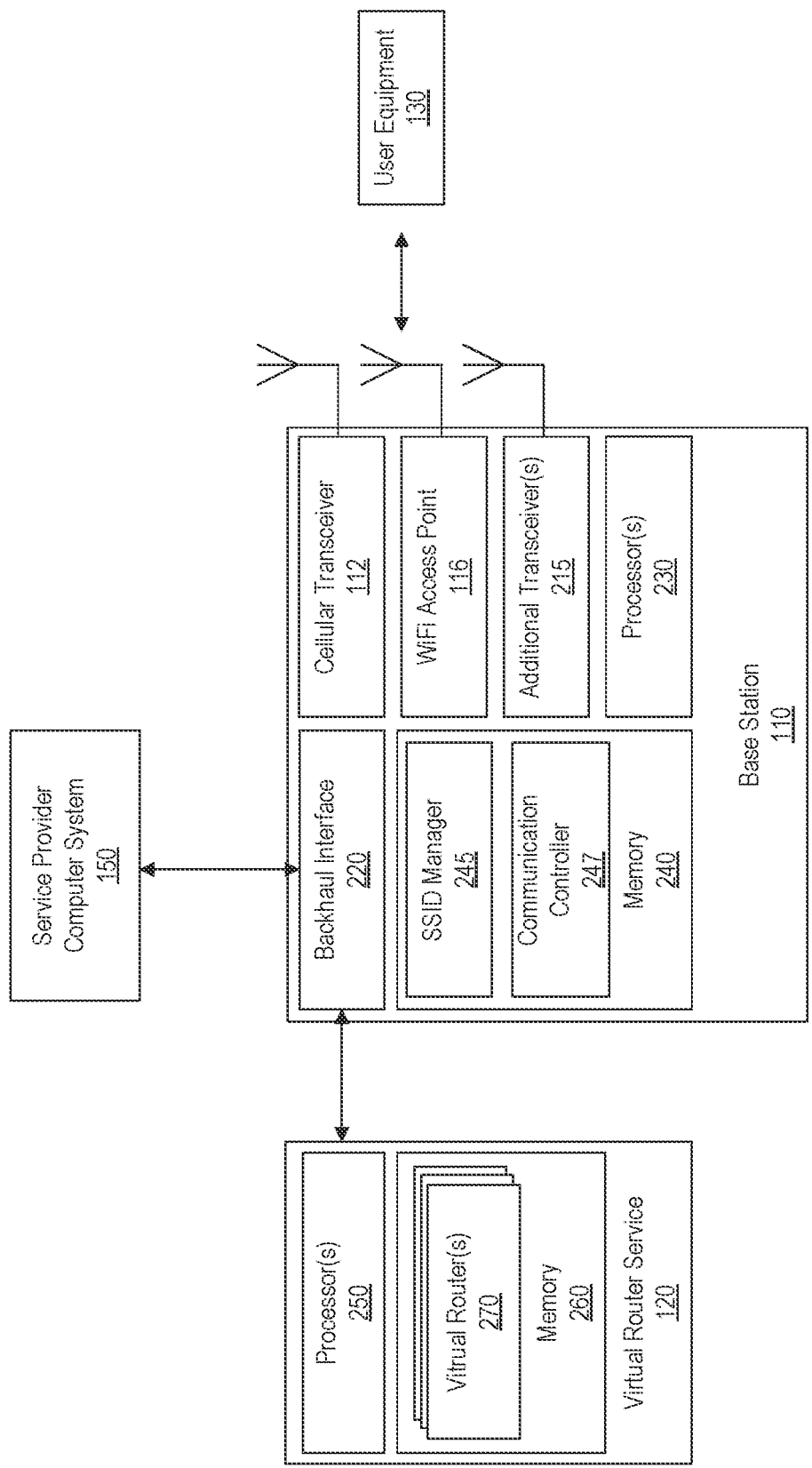
FIG. 2 illustrates a block diagram of an example base station and virtual router service system.

FIG. 2 illustrates a block diagram 200 of an example base station 110 and virtual router service 120 consistent with disclosed examples. As described above, base station 110 may be configured to support communications in accordance with multiple air interface standards and can include cellular transceiver 112 for longer range wireless air interface standards (e.g., LTE, 5G) and wireless access point 116 for supporting shorter range wireless air interface standards such as Wi-Fi or WiMAX. In some examples, base station 110 can also be configured to perform handover communications between different air interface standards between other base stations.

Base station 110 can include a small cell as is known in the art. For example, base station 110 can include components that facilitate transmission of data in accordance with the wireless air interface standards it supports, including, but not limited to, antennas, filters, radios, base station control components, network interface components and power supplies. One skilled in the relevant art will appreciate that all such components that could be implemented in a small cell are not illustrated in FIG. 2 for purposes of brevity and not limitation. Base station 110 can be configured into include both cellular transceiver 112 and wireless access point 116 into a form factor desired for a small cell, such as a femtocell form factor, picocell form factor, or microcell form factor, as just some examples.

In other examples, base station 110 may be configured to support other technologies, or more or less radios may be present in base station. For example, base station 110 can include additional transceivers 215 in addition to cellular transceiver 112 and wireless access point 116 for receiving signals in accordance with an interface standard. Additional transceivers 215 can be configured to receive signals in a manner redundant to either the cellular transceiver 112 or wireless access point 116 or in a manner additional to the first and second radio components. Each of cellular transceiver 112, wireless access point 116, and additional transceivers 215 include transceiver components and/or modulators that perform functions of transmitting and receiving radio. In addition, in some implementations additional transceivers 215 can include wired communication components, such as an Ethernet port, for communicating with computing devices such as computer terminals of service technicians.

Base station 110 can also include a communication controller 247. Communication controller 247 can include control software that provides operation and maintenance support for the communication technologies supported by base station 110. Communication controller 247 can include the same or variations of similar controllers included in other infrastructure equipment, such as macro cells, for example. Communication controller 247 can also be connected to backhaul interface 220 in base station 110. In various examples, base station 110 leverages a Small Form factor Pluggable (SFP) module as backhaul interface 220. This allows flexibility to backhaul traffic with fiber, Pico Ethernet, or a large variety of wireless backhaul products. In some examples, backhaul interface 220 incorporates Integrated Access Backhaul (IAB). In IAB, wireless spectrum is used for the backhaul connection of base stations instead of fiber or other wired means of backhaul. IAB can be beneficial in areas where wired connections or fiber is impractical or scarce. In some implementations, additional transceivers 215 can include a transceiver dedicated to IAB.

According to some examples, backhaul interface 220 of base station 110 can be connected to and in communication with virtual router service 120. Virtual router service 120 can include one or more processors 250 and memory 260 storing computer executable instructions that when executed by the one or more processors 250 perform operations and functions to provide virtual routers 270.

Virtual routers 270 are software or virtual implementations replicating in software the functionality of hardware-based Layer 3 Internet Protocol routing that is typically performed by a dedicated hardware device. The functionality performed by virtual routers 270 can include providing virtual private network (VPN) functionality, traffic engineering, route reflectors, firewalls, and standard typical packet routing expected under Layer 3 Internet Protocol. Virtual router service 120 may execute multiple virtual routers 270 at a time and may in some cases coordinate resources or share resources between the virtual routers 270.

In some implementations, virtual router service 120 may facilitate communication between one or more virtual routers 270 in situations where a customer has requested virtual wireless services at multiple base stations 110 using the SSID. In such implementations, virtual router service 120 may provision a first virtual router 270 using an SSID associated with a first base station 110 and a second virtual router 270 associated with a second base station 110 using the same SSID. Virtual router service 120 may then facilitate network communication between the two virtual routers sharing the SSID to form a virtual LAN spanning two different geographic locations (e.g., a first geographic location for the first base station and a second geographic location for the second base station).

Figure 3:
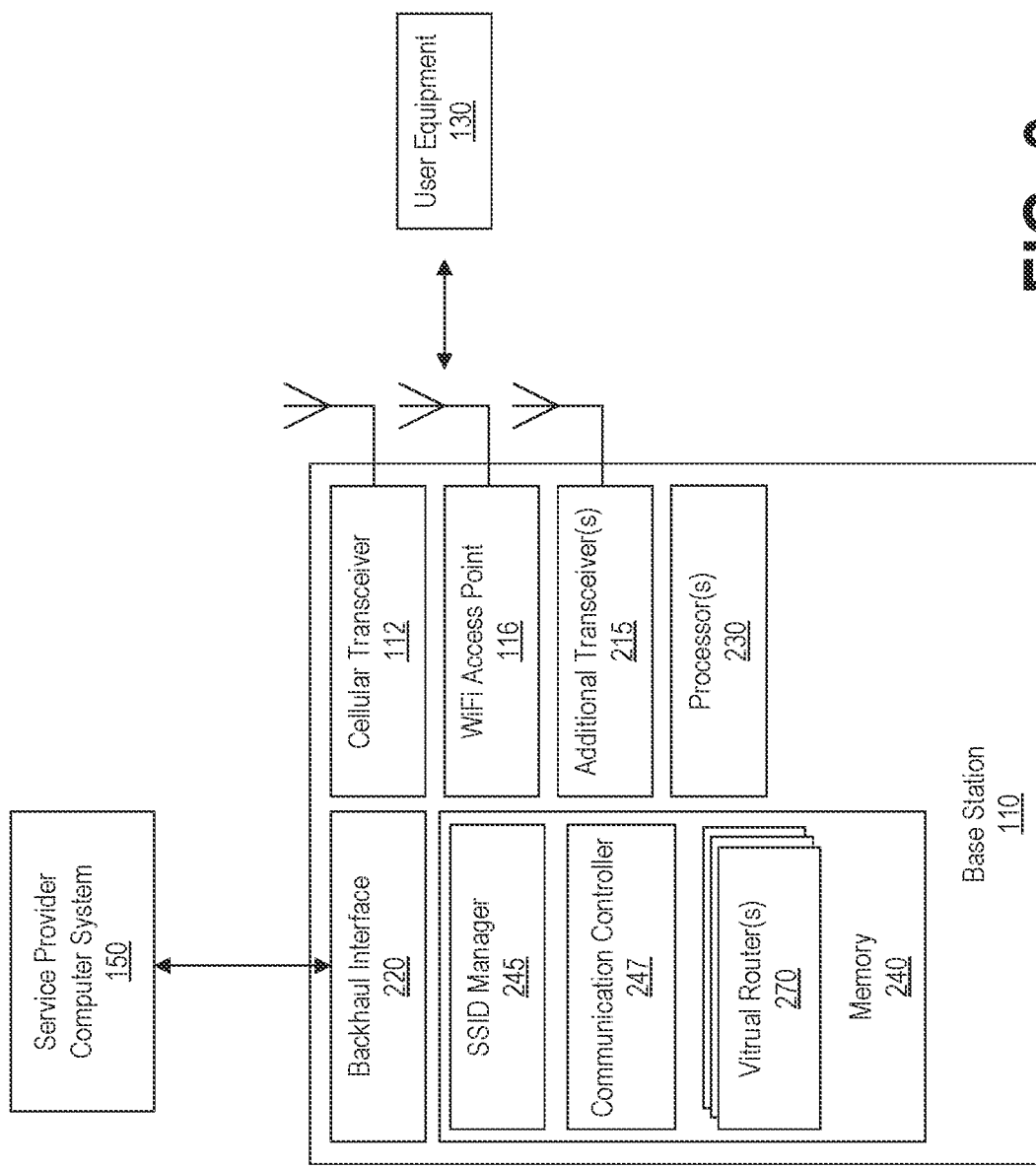
FIG. 3 illustrates a block diagram of an example base station.

FIG. 3 illustrates a block diagram of another example base station 110 consistent with disclosed examples. In the example base station 110 of FIG. 3, memory 240 of base station 110 stores one or more virtual routers 270. Virtual routers 270 executing at base station 110 operate and function similarly to virtual routers 270 executing at or within virtual router service 120, with the primary difference being the location of execution of virtual routers 270. For some implementations, it may be advantageous to have virtual routers 270 execute at the base station 110 as opposed to virtual router service 120. For example, when fiber-optic backhaul is limited or bandwidth for backhaul is limited, deploying virtual router 270 at base station 110 may reduce traffic and therefore improve performance of the virtual network service.

Figure 4:
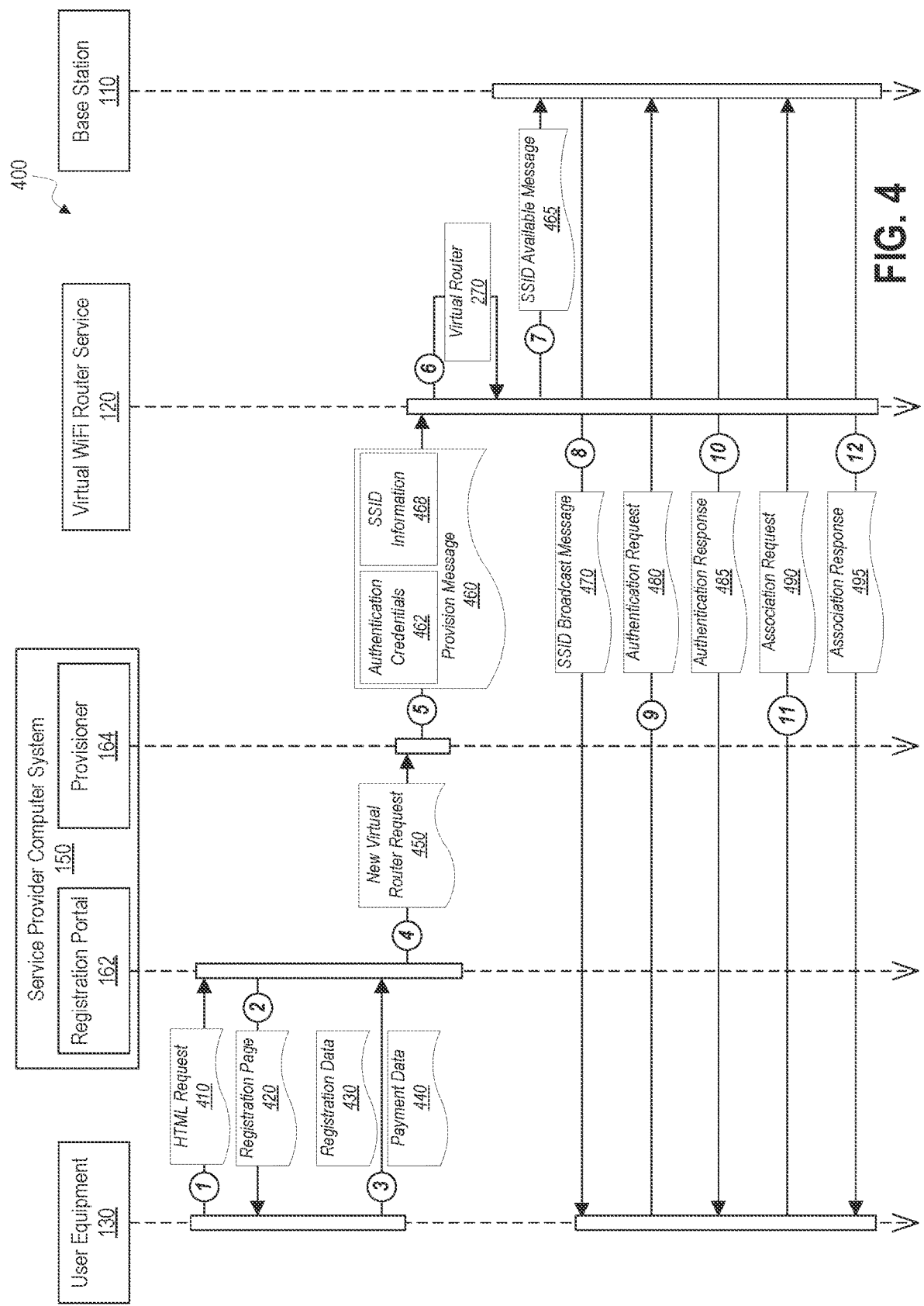
FIG. 4 illustrates a data flow sequence diagram showing an example sequence and flow of data between components of the telecommunications network environment of FIG. 1 consistent with disclosed examples.

FIG. 4 illustrates a data flow sequence diagram 400 showing an example sequence and flow of data between components of telecommunications network environment 100 consistent with disclosed examples. Data flow sequence diagram 400 relates to a use case or scenario where a customer registers for virtual wireless services and then uses the virtual wireless services at the base station through which the customer has registered for the service. In data flow sequence diagram 400, the flow of data is represented in a sequence with numerals indicating an example sequence of data flow. However, in some implementations the sequence of data flow may be performed in a different order than shown by the numerals in FIG. 4. Such differences in data flow may be based on specific implementations, and do not depart from the spirit and scope of the present disclosure.

User equipment 130, operated by a customer, may send HTML request 410 to registration portal 162 to gain access to a webpage allowing the customer to register for virtual wireless services. In response to HTML request 410, registration portal 162 may transmit to user equipment 130 registration page 420. Registration page 420 may include one or more user interface elements that allow a customer to register for virtual wireless services. The user interface elements can include, for example, text fields allowing a customer to enter their name address phone number and email address, drop-down boxes allowing customers to select a particular service level, or other user interface elements typical of service registration for wireless services or account creation.

Once a customer completes the information on registration page 420, user equipment 130 may transmit back to registration portal 162 registration data 430 and payment data 440. Registration data 430 can include a home address or business address of the customer, e.g., the address where the customer is most likely to use the virtual wireless services. The payment data 440 can include credit card information for example to allow for periodic and regular payment of the virtual wireless services.

Once registration portal 162 receives registration data 430 and payment data 440 it may verify both. If verification is successful, registration portal 162 may communicate a new virtual router request 450 to provisioner 164. New virtual router request 450 can include the service address for the virtual wireless services. Provisioner 164 can then determine, based at least in part on the service address, the appropriate base station 110 to which a new virtual router will be provisioned to provide virtual wireless services.

Once provisioner 164 determines the appropriate base station 110 for provisioning a virtual router, provisioner 164 may send provision message 460 to the virtual router service 120 associated with the appropriate base station 110. As noted above, in some implementations, the associated virtual router service 120 may be executed by processors associated with the base station 110 or the associated virtual router service 120 may executed by processors associated with a server or cloud-based computing system separate from the base station 110 and in communication with base station 110.

Provision message 460 can include authentication credentials 462 and SSID information 468. Authentication credentials 462 can include a username and password associated with the customer who has registered for virtual wireless services. In some implementations, authentication credentials 462 can also include additional codes, images, or other authentication information selected by the customer to increase security related to the virtual wireless services for which the customer has registered. SSID information 468 can include the name of the virtual wireless network supplied by the customer in registration data 430. SSID information 468 may also include information related to the virtual router associated with the virtual wireless network for which the customer is registered. For example, SSID information 468 can include information about security levels associated with the virtual wireless network, whether the SSID is to be broadcast by base station 110, and/or whether the SSID is to be encrypted.

Once virtual router service 120 receives provision message 460, it may provision virtual router 270. Once virtual router 270 has been instantiated and provisioned and enters a state whereby it can receive connection requests, virtual router service 120 may send an SSID available message 465 to base station 110 to inform base station 110 that virtual router 270 is available and ready.

Base station 110 may then send SSID broadcast message 470 via its wireless access point 116. SSID broadcast message 470 can be a message broadcast to computing devices within the range of wireless access point 116 of base station 110 letting such computing devices know that a SSID with the customer's selected SSID is available for connection. In some implementations, a customer may request that its SSID not be broadcast, and in such implementations, base station 110 would not broadcast SSID broadcast message 470. As such, user equipment 130 may request connection to the customer's SSID independent of base station 110 sending SSID broadcast message 470. User equipment 130 may also begin the authentication and association process responsive to receiving SSID broadcast message 470, or responsive to an input on user equipment 130 requesting connection to the SSID.

User equipment 130 may then begin the standard authentication and association process consistent with Wi-Fi or WiMAX standards. For example, under 802.11, user equipment 130 may be in one of three connection states: (1) not authenticated or associated; (2) authenticated but not yet associated; and (3) authenticated and associated. When user equipment 130 is in the third state—authenticated and associated—user equipment 130 can begin to use virtual router 270 for communications as it would any traditional hardware router.

The authentication and association process begins with user equipment 130 sending authentication request 480. Authentication request 480 can include a low-level 802.1X authentication frame and can include WEP encryption. In some examples, authentication request 480 can also include WPA2 or 802.1X authentication information to authenticate user equipment 130 and provide access to virtual router 270. Note that in some examples, and while not shown in FIG. 4, authentication request 480 may occur in two steps one via a authentication for WEP encryption or as part of the 802.11 standard authentication process, and a second step where user equipment 130 sends WPA2 or 802.1X authentication information. In such examples, the timing of part of authorization request for 480 (and subsequent authentication response 485) can occur after the association step. For example, in some implementations, a first part of authentication request 480 related to WEP authentication can occur before association, and a second part of authentication request 480 related to authentication under WPA2 can occur after association.

Once base station 110 receives authentication request 480, it can send authentication response 485 informing user equipment 130 that authentication was successful or unsuccessful. If authentication was successful, user equipment 130 may send association request 490 requesting association with the SSID of virtual router 270. In some of implementations, association request 490 can include information regarding types of encryption and other capabilities related to the 802.1X standard. Once base station 110 receives association request 490, base station 110 will verify that its wireless access point 116 is compatible with user equipment 130, and may send association response 495 informing user equipment 130 that association was successful or unsuccessful.

Figure 5:
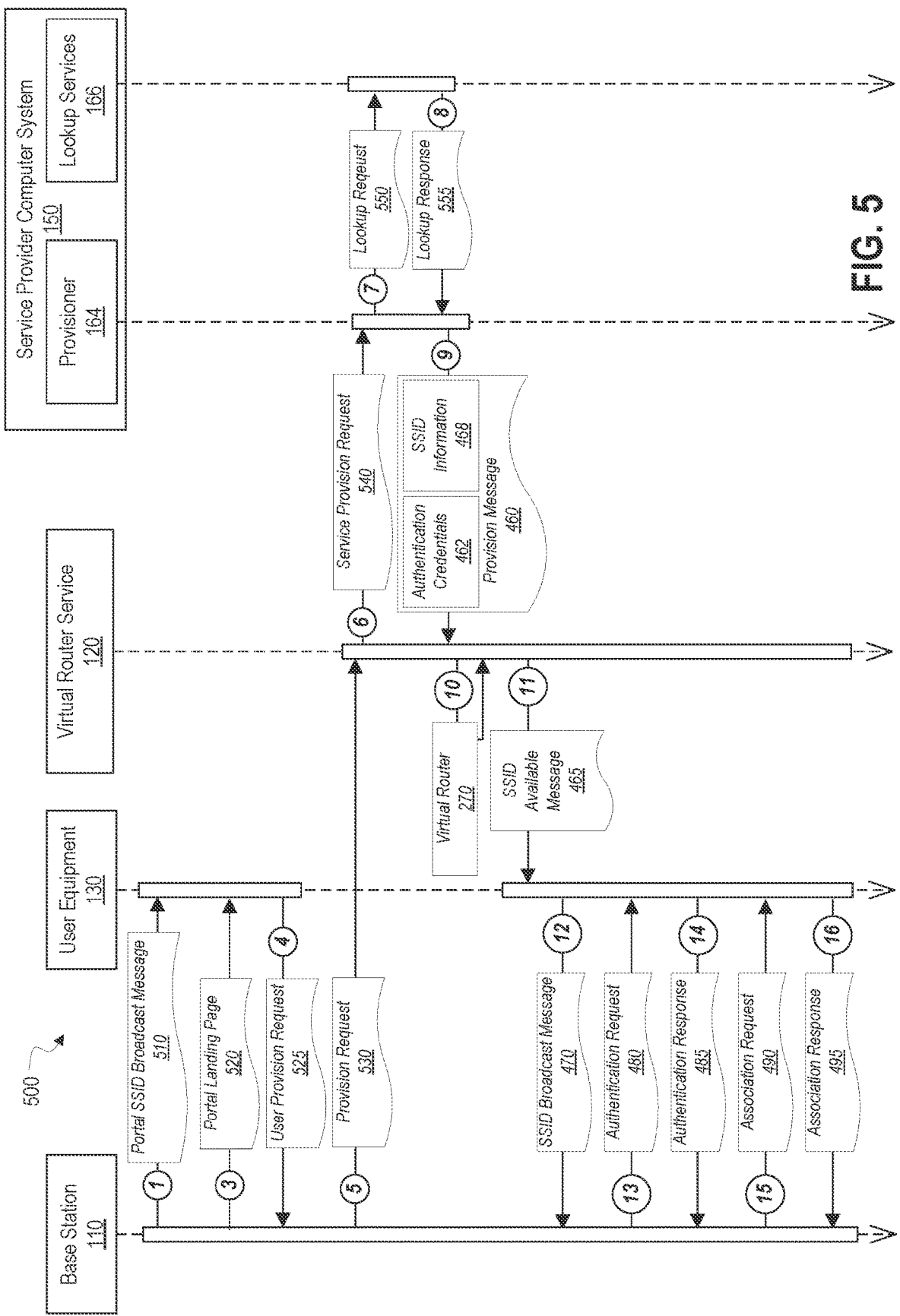
FIG. 5 illustrates a data flow sequence diagram showing an example sequence and flow of data between components of the telecommunications network environment of FIG. 1 consistent with disclosed examples.

FIG. 5 illustrates a data flow sequence diagram 500 showing an example sequence and flow of data between components of telecommunications network environment 100 of FIG. 1 consistent with disclosed examples. Data flow sequence diagram 500 relates to a use case or scenario where a customer accesses a portal landing page to request provisioning of a virtual router at a location different than where the customer typically uses virtual wireless services. For example, when a customer uses virtual wireless services while traveling, user equipment 130 would not be connected to the base station proximate to the customer's home or business. Instead, the customer's user equipment would connect to the base station in closest proximity to user equipment 130 that was capable of providing virtual wireless services. Such a base station may provide the ability for user equipment to connect to the base station and provide a portal landing page whereby the customer can request that a virtual router be provisioned at that base station.

In data flow sequence diagram 500, the flow of data is represented in a sequence with numerals indicating a typical sequence of data flow. However, in some implementations the sequence of data flow may be performed in a different order than shown by the numerals in FIG. 5. Such differences in data flow may be based on specific implementations, and do not depart from the spirit and scope of the present disclosure. Moreover, much of the data flow shown in data flow sequence diagram 500 is consistent with or duplicative of data flow shown in data flow sequence diagram 400. Such data flow will be noted in the description that follows, but will not be repeated in detail for the sake of brevity.

In some examples, wireless access point 116 may make available a universal or generic SSID known to subscribers of virtual wireless services. For example, a service provider providing virtual wireless services may let it be known to its customers that base stations of the service provider where virtual wireless services are available may have wireless access points that broadcast an SSID of "Service Provider Portal Network." A customer of the service provider can look for wireless networks named "Service Provider Portal Network" when away from their home base stations and connect to the "Service Provider Portal Network" wireless network to reach a portal landing page to request that a virtual router with the customer's specific SSID be provisioned to the base station.

In such examples, base station 110 may broadcast a portal SSID broadcast message 510 that includes the SSID of the wireless network providing the portal of the service provider. User equipment 130 may connect to the service provider portal using the SSID. Once connected, base station 110 may transmit portal landing page 520 to user equipment 130. Portal landing page 520 can include a webpage that provides one or more user interface elements allowing a customer operating user equipment 130 to enter the customer's identification information (e.g., name, email address, user ID, password, virtual network SSID) and send the request (e.g., a button or hyperlink). User equipment 130 may send user provision request 525 to base station 110. User provision request 525 can include the information entered in the portal landing page 520 and can contain information, such as the customer's SSID or that may be necessary for service provider computer system 150 to provision a virtual router having the customer's SSID at base station 110.

After base station 110 receives user provision request 525, it may create provision request 530 and send it to virtual router service 120. Provision request 530 can include customer information such as username and password or other identifiable information related to the customer and the customer's virtual wireless services account. Provision request 530 can also include the customer's SSID and an identifier associated with base station 110. Provision request 530 serves as a request to provision virtual router 270 having the customer's SSID at base station 110. As noted above, virtual router service 120 may execute on one or more processors of base station 110, and in such implementations, provision request 530 may be a request internal to base station 110.

Upon receiving provision request 530, virtual router service 120 may issue a service provision request 540 to provisioner 164 of service provider computer system 150. The purpose of service provision request 540 is to check with provisioner 164 and determine whether the SSID of user SSID message 610 is one for which a customer has registered for virtual wireless services and that the customer is current with payment or other obligations for receiving virtual wireless services from the service provider. Provisioner 164 may send lookup request 550 to lookup services 166 to determine whether virtual wireless services are available for the SSID provided in service provision request 540. Lookup services 166 can then send lookup response 555 to provisioner 164 informing provisioner 162 as to the status of virtual wireless services for that SSID.

When lookup response 555 indicates that virtual wireless services are available for the SSID, provisioner 164 sends provision message 460 to virtual router service 120. Once virtual router service receives provision message 460 it may instantiate and provision virtual router 270 with the SSID initially provided by user equipment 130 in user SSID message 610. From that point, user equipment 130 may authenticate and associate with the wireless access point 116 as described above with respect to FIG. 4.

Figure 6:
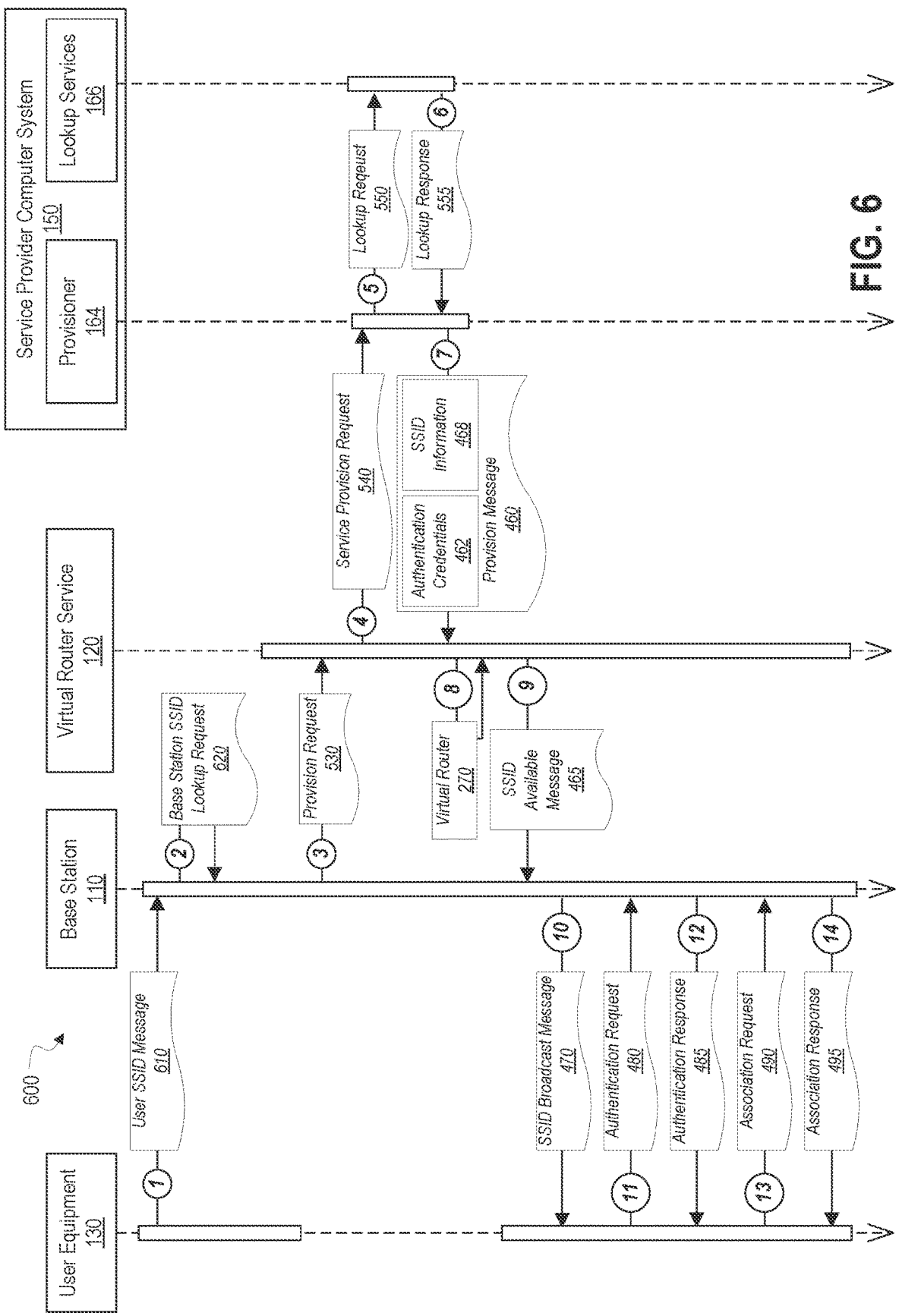
FIG. 6 illustrates a data flow sequence diagram showing an example sequence and flow of data between components of the telecommunications network environment of FIG. 1 consistent with disclosed examples.

FIG. 6 illustrates a data flow sequence diagram 600 showing an example sequence and flow of data between components of the telecommunications network environment 100 of FIG. 1 consistent with disclosed examples. Data flow sequence diagram 600 relates to a use case or scenario where a customer attempts to connect to a virtual wireless network provided by a virtual router at a point in time when the customer has already registered for, or used, virtual wireless network services in the past. The example provided in FIG. 6 is one where base station 110 can receive requests for specific SSIDs and provision virtual routers accordingly.

In data flow sequence diagram 600, the flow of data is represented in a sequence with numerals indicating a typical sequence of data flow. However, in some implementations the sequence of data flow may be performed in a different order than shown by the numerals in FIG. 6. Such differences in data flow may be based on specific implementations, and do not depart from the spirit and scope of the present disclosure. Moreover, much of the data flow shown in data flow sequence diagram 600 is consistent with and duplicative of data flow shown in data flow sequence diagram 400 and data flow sequence diagram 500. Such data flow will be noted in the description that follows but will not be repeated detail for the sick of brevity.

When attempting connection to a virtual router, user equipment 130 may send user SSID message 610 to wireless access point 116 of base station 110. User SSID message 610 can include an SSID for a virtual router to which user equipment 130 wishes to establish a connection. User equipment 130 may send user SSID message 610 to base station 110 responsive to SSID broadcast message 470 (described above with respect to FIG. 4). In some implementations, user equipment 130 may send user SSID message 610 when it wishes to connect to a virtual router 270 identified by the SSID. For example, user equipment 130 may send user SSID message 610 after it is been powered up, after it has lost a network connection, or responsive to a user performing a set of user input actions requesting connection to the SSID.

Once base station 110 receives user SSID message 610, it may perform an internal lookup request in the form of base station SSID lookup request 620 to determine whether a virtual router 270 matching the SSID contained within user SSID message 610 has already been provisioned at base station 110. If base station 110 already has access to a provisioned virtual router 270 matching the SSID of user SSID message 610, user equipment 130 and base station 110 may perform the authentication and association process described above with respect to FIG. 4. If, however, base station 110 does not have access to a provisioned virtual router 270 matching the SSID of user SSID message 610, base station 110 may send provision request 530 to virtual router service 120 requesting that virtual router service 120 provision a virtual router having an SSID matching the SSID of user SSID message 610. As noted above, virtual router service 120 may execute on a processor of base station 110, and in such implementations, provision request 530 may be a request internal to base station 110.

Once virtual router service 120 receives provision request 530, the sequence of data flow may be similar to that described above with respect to FIG. 5. For example, virtual router service 120 may send a service provision request 540 to provisioner 164 of service provider computer system 150, provisioner 164 may use lookup services 166 to determine whether virtual wireless services are available for the SSID of user SSID message 610, and provisioner 164 may then send provision message 460 back to virtual router service 120. Virtual router service 120 may then instantiate and provision virtual router 270 consistent with disclosed examples, and user equipment 130 and base station 110 may perform the authentication and association process.

Figure 7:
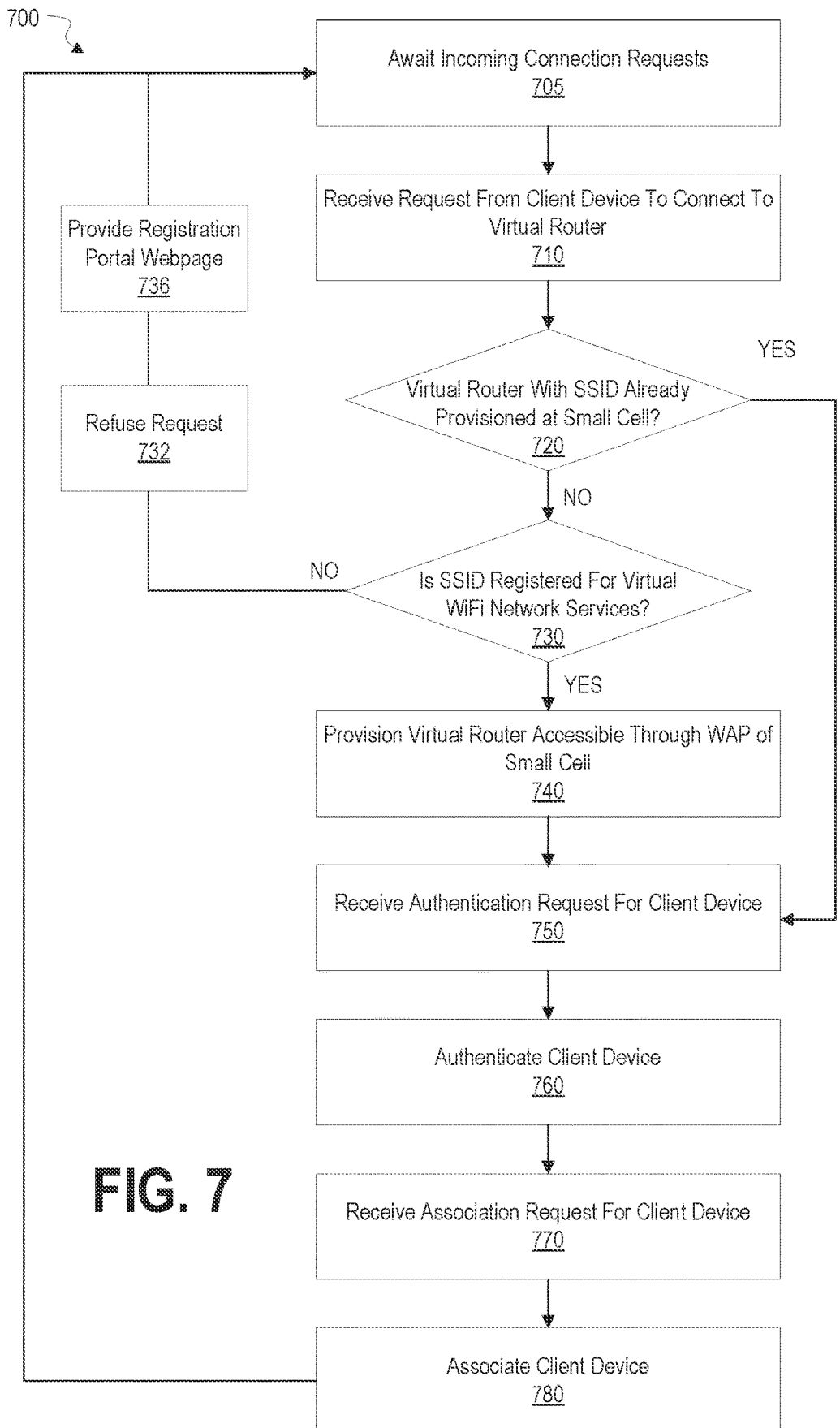
FIG. 7 illustrates a flowchart for an example process 700 for provisioning a virtual Wi-Fi network via a virtual router consistent with disclosed examples.

FIG. 7 illustrates a flowchart for an example virtual router provision process 700 for provisioning a virtual router and provide virtual wireless services consistent with disclosed examples. Virtual router provision process 700 can be performed by various components of network environment 100. For example, aspects of virtual router provision process 700 can be performed by base station 110, virtual router service 120, and/or service provider computer system 150. Although the following discussion may describe aspects of virtual router provision process 700 as being performed by certain components, other components described in the present disclosure may perform these aspects without departing from the spirit and scope of the present disclosure.

At block 705, base station 110 may wait for incoming connection requests associated with virtual wireless services. At block 710, base station 110 may receive a request from a client device, such as user equipment 130, to connect to a virtual router providing virtual wireless services. The request base station receives at block 710 can include an SSID. The SSID may be one associated with virtual wireless services for which a customer operating the client device has registered.

Once the request is received by the base station 110, base station 110 will determine if a virtual router matching the SSID of the request has already been provisioned and is available through base station 110. If a virtual router matching the SSID has already been provisioned (block 720: YES), then processing moves to block 750, described below. If, however, there is no virtual router matching the SSID of the request provisioned and available through base station 110 (block 720: NO), processing moves to block 730.

At block 730, base station 110 determines if the SSID of the request received in block 710 is associated with a customer that has registered for virtual wireless services and is up to date with payment or other requirements for receiving the services. Base station 110 may perform this operation by contacting service provider computer system 150. As noted above, in some examples, base station 110 may not handle the operations and functionality for provisioning virtual routers. It may instead make a request for provisioning to virtual router service 120. In such examples, virtual router service 120 may make a request to service provider computer system 150 at block 730 to determine whether the SSID is associated with an active registration for virtual Wi-Fi network services.

If the received SSID is not associated with an active registration for virtual wireless services (block 730: NO), base station 110 refuses the connection request at block 732. In some examples, base station 110 may provide a registration portal webpage at block 736. The portal registration webpage can be similar to registration page 420 described above with respect to FIG. 4. For example, it may provide user interface elements allowing a customer to provide the information needed to register for virtual wireless services. If, however, the received SSID is associated with an active registration for virtual wireless services (block 730: YES), processing moves to block 740.

At block 740, a virtual router 270 is provisioned at base station 110 and made accessible through the wireless access point 116 of the base station 110. Provisioning of a virtual router can be accomplished through a combination of the service provider computer system 150, the virtual router service 120, and/or the base station 110 consistent with disclosed examples. Once the virtual router 270 is provisioned, processing then moves to block 750.

At block 750 to block 780, process 700 performs authentication and association as described above with respect to authentication request 480, authentication response 485, association request 490, and association response 495 described above with respect to FIG. 4.

In some examples, the operations of process 700 may be performed out of the order presented, with additional elements, and/or without some elements. Some of the operations of process 700 may further take place substantially concurrently and, therefore, may conclude in an order different from the order of operations shown above.

Figure 8:
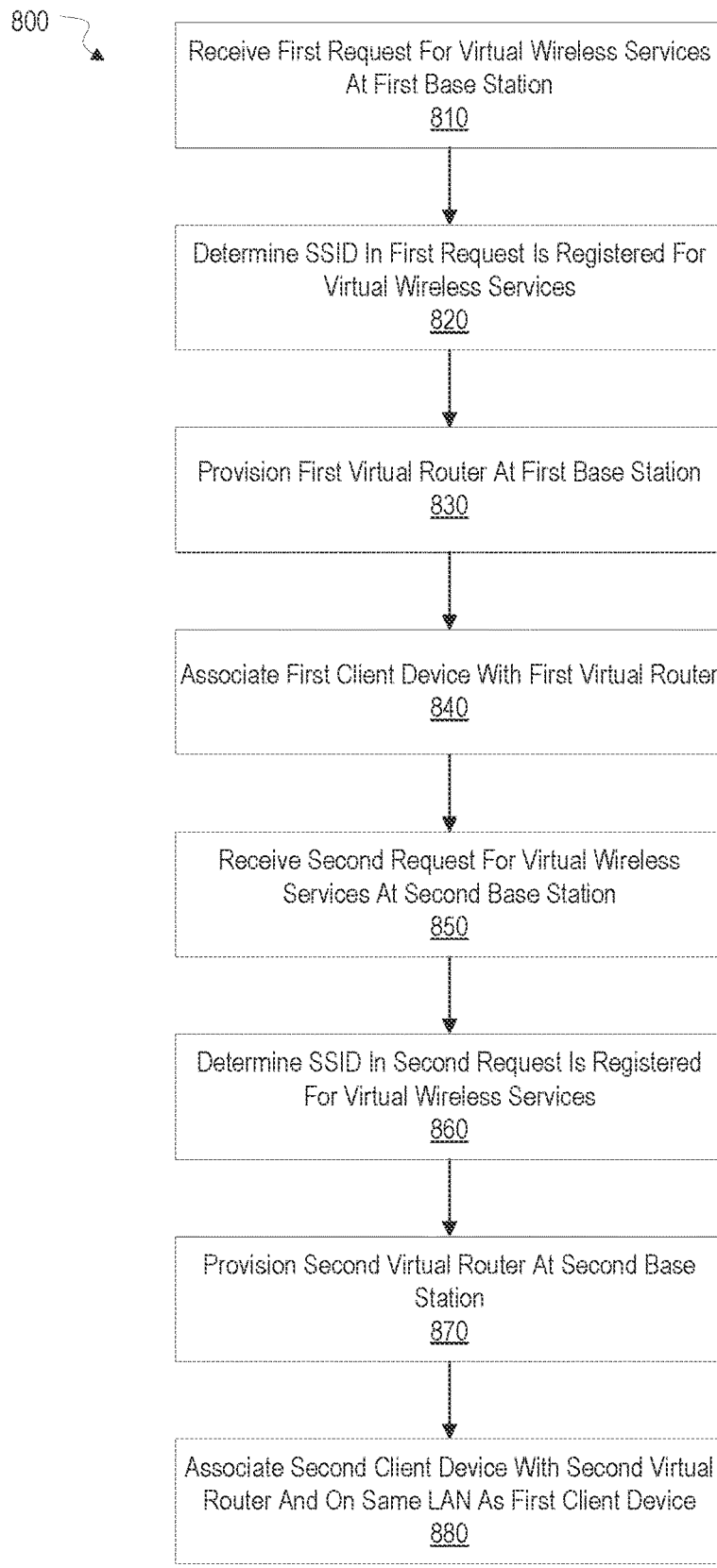
FIG. 8 illustrates a flowchart for an example process for providing virtual Wi-Fi network services to two client devices consistent with disclosed examples.

FIG. 8 illustrates a flowchart for an example multiple virtual router provision process 800 for provisioning a virtual wireless network via virtual router provisioned at multiple base stations consistent with disclosed examples. Multiple virtual router provision process 800 can be performed by various components of network environment 100. For example, aspects of multiple virtual router provision process 800 can be performed by multiple base stations 110, virtual router service 120, and/or service provider computer system 150. Although the following discussion may describe aspects of virtual router provision process 800 as being performed by certain components, other components described in the present disclosure may perform these aspects without departing from the spirit and scope of the present disclosure.

At block 810, a first base station may receive a request from user equipment to connect to virtual wireless services. The request can include a SSID that may be associated with an account of a customer that has registered for virtual wireless services from a service provider that controls or operates the first base station.

At block 820, the first base station may determine whether the SSID included in the request received at block 810 is registered for virtual wireless services. For example, the first base station may follow a process similar to that described above with respect to FIG. 7 blocks 710 through 736 when determining whether the SSID is one registered for virtual wireless services. Once the first base station makes this determination, it will cause provisioning of a first virtual router connectable through its wireless access point. Provisioning of the first virtual router may follow a process similar to that described above with respect to FIGS. 4-7, in various examples.

At block 840, after the first base station provisions the first virtual router, the first base station may associate a first client device with the virtual router. The first client device may be the user equipment that sent the request received at block 810, or it may be some other piece of user equipment wishing to use virtual wireless services. Although the above description describes connection of one piece of user equipment, or a first client device, to a first base station, the first virtual router provisioned in association with the first base station can accept connections from multiple pieces of user equipment.

At block 850, a second base station within the telecommunications network of the service provider may receive a second request for virtual wireless services. The request may include the same SSID received by the first base station at block 810 above. The second base station may be located in a different location within the telecommunications network, and the request the second base station receives at block 850 may have originated from a different piece of user equipment than what sent the request at block 810.

At block 860, the second base station may determine whether the SSID included in the second request received at block 850 is registered for virtual wireless services. This determination process is similar to the process followed by the first base station at block 820. For example, the second base station may follow a process similar to that described above with respect to FIG. 7, blocks 710 through 736 when determining whether the SSID is one registered for virtual wireless services. Once the second base station makes this determination, it will cause provisioning of a second virtual router connectable through its wireless access point at 870. Again, the process followed by the second base station at block 870 will be similar to the process followed by the first base station at block 830, e.g., provisioning of the second virtual router may follow a process similar to that described above with respect to FIGS. 4-7, in various examples.

In some examples, the first virtual router and the second virtual router execute and operate within the same instance of virtual router service 120. While not stated above, in alternative examples, the first virtual router and the second virtual router may be the same instance of a virtual router whereby both the first and second base stations offer connections to the virtual router via their respective connections to virtual router service 120.

At block 880, after the second base station provisions the second virtual router, the second base station may associate a second client device with the second virtual router. The second client device may be the user equipment that sent the request received at block 850, or it may be some other piece of user equipment wishing to use virtual wireless services. Although the above description describes the connection of one piece of user equipment, or a second client device, to a second base station, the second virtual router provisioned in association with the first base station can accept connections from multiple pieces of user equipment.

The first virtual router and the second virtual router described above with respect to process 800 use the same SSID, refer to the same customer account, and can create a virtual local area network allowing multiple pieces of user equipment that are geographically separated and connected to separate base stations to communicate as if they were on the same LAN. This may allow, for example, a customer connected to a base station while traveling on business to print a document at the customer's home, provided that both the customer's laptop for business and the printer are connected to virtual wireless services using the same SSID.

In some examples, the operations of process 800 may be performed out of the order presented, with additional elements, and/or without some elements. Some of the operations of process 800 may further take place substantially concurrently and, therefore, may conclude in an order different from the order of operations shown above.

Many of the examples described above describe computing devices, computing systems or structures having aspects of computing systems. For example, disclosed examples describe base station 110 having one or more processors 230 and memory 240, virtual router service 120 which could be a server having or more processors 250 and memory 260 or a collection cloud computing components each having a one or more processors 250 and memory 260, and service provider computer system 150 also having one or more processors 155 and memory 160. In addition, while not described in detail, user equipment 130 can also include one or more processors and memory depending on the example of user equipment 130.

As used in the present disclosure, processors 155, 230, 250 can include one or more of a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip system(s) (SOCs), complex programmable logic devices (CPLDs), etc. Additionally, each of the processors 155, 230, 250 may possess its own local memory, which also may store program modules, program data, and/or one or more operating system(s). One or more processor(s) 155, 230, 250 may include one or more cores, depending on the example.

Also used in the present disclosure, memory 160, 240, 260 can include computer-readable media that can be volatile and/or nonvolatile memory. It can also include removable and/or non-removable media implemented in any method or technology for storage of information, such as computer-readable instructions, data structures, program modules, or other data. Memory 160, 240, 260 can include, but is not limited to, random access memory (RAM), read-only memory (ROM), electrically erasable programmable read-only memory (EEPROM), flash memory or other memory technology, CD-ROM, digital versatile discs (DVD) or other optical storage, magnetic cassettes, magnetic tape, magnetic disk storage or other magnetic storage devices, RAID storage system(s), or any other medium which can be used to store the desired information and which can be accessed by a computing device.

Memory 160, 240, 260 may be implemented as computer-readable storage media (CRSM), which may be any available physical media accessible by processors 155, 230, 250 to execute instructions stored on the memory 160, 240, 260. In one implementation, CRSM may include RAM and Flash memory. In other implementations, CRSM may include, but is not limited to, ROM, EEPROM, or any other tangible medium which can be used to store the desired information, which can be accessed by the processors 155, 230, 250. Memory 160, 240, 260 may have an operating system (OS) and/or a variety of suitable applications stored thereon. The OS, when executed by the processors 155, 230, 250 may enable management of hardware and/or software resources.

Several functional blocks having instruction, data stores, and so forth may be stored within the memory 160, 240, 260 and configured to execute on processors 155, 230, 250. For example, memory 160, 240, 260 may have stored thereon a registration portal 162, a provisioner 164, lookup services 166, and SSID manager 245, the communication controller 247, and one or more virtual routers 270, consistent with the examples of the present disclosure. Each of these components may include instructions that when executed by processors 155, 230, 250 may enable various functions pertaining to the operations of the disclosed examples.

The disclosure is described above with reference to block and flow diagrams of system(s), methods, apparatuses, and/or computer program products according to examples of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some examples of the disclosure.

Computer-executable program instructions may be loaded onto a general purpose computer, a special-purpose computer, a processor, or other programmable data processing apparatus to produce a particular machine, such that the instructions that execute on the computer, processor, or other programmable data processing apparatus for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and datastores can be in communication with each other and/or other datastores, such as a centralized datastore, or other types of data storage devices. When needed, data or information stored in a memory or datastore may be transmitted to a centralized datastore capable of receiving data, information, or data records from more than one datastore or other data storage devices. In other examples, the datastores shown can be integrated or distributed into any number of datastores or other data storage devices.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

Many modifications and other examples of the disclosure set forth herein will be apparent having the benefit of the teachings presented in the foregoing descriptions and the associated drawings. Therefore, it is to be understood that the disclosure is not to be limited to the specific examples disclosed and that modifications and other examples are intended to be included within the scope of the appended claims. Although specific terms are employed herein, they are used in a generic and descriptive sense only and not for purposes of limitation. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A telecommunications system comprising:
   a small cell in a base station and comprising:
      a transceiver associated with a cellular network, and
      a wireless access point configured to exchange short-range communications;
   one or more processors; and
   computer readable media storing executable instructions that when executed by the one or more processors cause the one or more processors to perform operations comprising:
      receiving, via the wireless access point, a service request from a client device, the service request including a service set identifier (SSID);
      determining that the SSID is registered by a user of the client device for virtual wireless services;
      determining that authentication credentials utilized to provision the virtual wireless services are associated with the SSID;
      receiving, from a service provider computer system, and via the cellular network, based at least in part on the SSID being registered, and on the authentication credentials being associated with the SSID, a service provider provision message including the SSID and the authentication credentials, the service provider provision message being utilized by one or more computing systems networked with the base station to provision a virtual router;
      provisioning the virtual router to be accessible through the wireless access point, the virtual router being identifiable using the SSID;
      receiving, from the client device, an authentication request to connect to the virtual router, the authentication request including the SSID;
      authenticating the client device based at least in part on whether the authentication request includes information matching the authentication credentials;
      receiving an association request from the client device, the association request including the SSID; and
      associating the client device with the virtual router.

2. The telecommunications system of claim 1, wherein the client device is a first client device, the authentication request is a first authentication request, the association request is a first association request, and the executable instructions cause the one or more processors to perform further operations comprising:

receiving, from a second client device, a second authentication request to connect to the virtual router, the second authentication request including the SSID;

authenticating the second client device based at least in part on whether the second authentication request includes the information matching the authentication credentials;

receiving a second association request from the second client device, the second association request including the SSID; and associating the second client device with the virtual router.

3. The telecommunications system of claim 1, wherein the transceiver is connected to the cellular network via a fiberoptic connection.

4. The telecommunications system of claim 1, wherein the transceiver is connected to the cellular network wirelessly using Integrated Access and Backhaul (IAB).

5. The telecommunications system of claim 1, further comprising a WiFi repeater connected to the wireless access point.

6. The telecommunications system of claim 1, wherein the SSID includes an identifier provided by a customer through a registration portal.

7. The telecommunications system of claim 1, wherein the transceiver is a radio frequency (RF) transceiver configured to exchange cellular signals, the short-range communications include WiFi communications, and the wireless access point includes a wireless transceiver configured to exchange WiFi signals, wherein provisioning the virtual router further comprises instantiating and provisioning the virtual router to receive connection requests transmitted by the client device, and wherein the virtual router leverages WiFi capabilities of the wireless access point to provide the virtual wireless services based at least in part on the connection requests.

8. The telecommunications system of claim 1, further comprising:

a base station, including the small cell, the small cell including the transceiver being a radio frequency (RF) transceiver configured to exchange cellular signals, the small cell including the wireless access point that includes a wireless transceiver configured to exchange WiFi signals, wherein the virtual router is deployed to the base station to facilitate cellular and WiFi data transmissions via the RF transceiver and the wireless transceiver, respectively, to provide the virtual wireless services.

9. A method comprising:

receiving, via a wireless access point of a base station comprising a small cell transceiver associated with a cellular network, a service request from a client device, the service request including a service set identifier (SSID), the wireless access point being configured to exchange short-range communications;

determining that the SSID is registered by a user of the client device for virtual wireless services;

determining that authentication credentials utilized to provision the virtual wireless services are associated with the SSID;

receiving, from a service provider computer system, and via the cellular network, based at least in part on the SSID being registered, and on the authentication credentials being associated with the SSID, a service provider provision message including the SSID and the authentication credentials, the service provider provision message being utilized by one or more computing systems networked with the base station to provision a virtual router;

provisioning the virtual router to be accessible through the wireless access point, the virtual router being identifiable using the SSID;

receiving, from the client device, an authentication request to connect to the virtual router, the authentication request including the SSID;

authenticating the client device based at least in part on whether the authentication request includes information matching the authentication credentials;

receiving an association request from the client device, the association request including the SSID; and associating the client device with the virtual router.

10. The method of claim 9, wherein the client device is a first client device, the authentication request is a first authentication request, and the association request is a first association request, further comprising:

receiving, from a second client device, a second authentication request to connect to the virtual router, the second authentication request including the SSID;

authenticating the second client device based at least in part on whether the second authentication request includes the information matching the authentication credentials;

receiving a second association request from the second client device, the second association request including the SSID; and associating the second client device with the virtual router.

11. The method of claim 9, wherein the small cell transceiver is connected to the cellular network via a fiberoptic connection.

12. The method of claim 9, wherein the small cell transceiver is connected to the cellular network wirelessly using Integrated Access and Backhaul (IAB).

13. The method of claim 9, wherein the SSID includes an identifier provided by a customer through a registration portal.

14. The method of claim 9, wherein the small cell transceiver is a radio frequency (RF) transceiver configured to exchange cellular signals, the short-range communications include WiFi communications, and the wireless access point includes a wireless transceiver configured to exchange WiFi signals, wherein provisioning the virtual router further comprises instantiating and provisioning the virtual router to receive connection requests transmitted by the client device, and wherein the virtual router leverages WiFi capabilities of the wireless access point to provide the virtual wireless services based at least in part on the connection requests.

15. A non-transitory computer-readable medium having stored thereon executable instructions that when executed by one or more processors of a base station cause the one or more processors to perform operations comprising:

receiving, via a wireless access point of the base station comprising a small cell transceiver associated with a cellular network, a service request from a client device, the service request including a service set identifier (SSID), the wireless access point being configured to exchange short-range communications;

determining that the SSID is registered by a user of the client device for virtual wireless services;

determining that authentication credentials utilized to provision the virtual wireless services are associated with the SSID;

receiving, from a service provider computer system, and via the cellular network, based at least in part on the SSID being registered, and on the authentication credentials being associated with the SSID, a service provider provision message including the SSID and the authentication credentials, the service provider provision message being utilized by one or more computing systems networked with the base station to provision a virtual router;

provisioning the virtual router to be accessible through the wireless access point, the virtual router being identifiable using the SSID;

receiving, from the client device, an authentication request to connect to the virtual router, the authentication request including the SSID;

authenticating the client device based at least in part on whether the authentication request includes information matching the authentication credentials;

receiving an association request from the client device, the association request including the SSID; and associating the client device with the virtual router.

16. The non-transitory computer-readable medium of claim 15, wherein the client device is a first client device, the authentication request is a first authentication request, the association request is a first association request, and the operations further comprise:

receiving, from a second client device, a second authentication request to connect to the virtual router, the second authentication request including the SSID;

authenticating the second client device based at least in part on whether the second authentication request includes the information matching the authentication credentials;

receiving a second association request from the second client device, the second association request including the SSID; and associating the second client device with the virtual router.

17. The non-transitory computer-readable medium of claim 15, wherein the small cell transceiver is connected to the cellular network via a fiberoptic connection.

18. The non-transitory computer-readable medium of claim 15, wherein the small cell transceiver is connected to the cellular network wirelessly using Integrated Access and Backhaul (IAB).

19. The non-transitory computer-readable medium of claim 15, wherein the base station further comprises a WiFi repeater connected to the wireless access point.

20. The non-transitory computer-readable medium of claim 15, wherein the SSID includes an identifier provided by a customer through a registration portal.

* * * * *